(12) United States Patent
Thomas et al.

(10) Patent No.: US 7,387,809 B2
(45) Date of Patent: Jun. 17, 2008

(54) THERMALLY PROCESSED MEAT PRODUCTS

(75) Inventors: David J. Thomas, Woodbury, MN (US); Kyle A. Newkirk, St. Michael, MN (US)

(73) Assignee: General Mills Cereals, LLC, Minneapolis, MN (US)

( * ) Notice: Subject to any disclaimer, the term of this patent is extended or adjusted under 35 U.S.C. 154(b) by 726 days.

(21) Appl. No.: 11/012,432

(22) Filed: Dec. 15, 2004

(65) Prior Publication Data

US 2005/0100642 A1   May 12, 2005

Related U.S. Application Data

(62) Division of application No. 10/229,983, filed on Aug. 28, 2002, now Pat. No. 6,869,631.

(51) Int. Cl.
A23L 1/314 (2006.01)
A23L 1/318 (2006.01)

(52) U.S. Cl. .............. 426/281; 426/641; 426/652; 426/656; 426/661

(58) Field of Classification Search ........... 426/281, 426/641, 652, 656, 661
See application file for complete search history.

(56) References Cited

U.S. PATENT DOCUMENTS 3,792,173 A    2/1974 Glabe
4,076,846 A *  2/1978 Nakatsuka et al. ........... 426/62
4,746,522 A *  5/1988 Wofford et al. ............ 426/243
5,384,140 A    1/1995 Gagel et al.
6,187,336 B1   2/2001 Okumura et al.

FOREIGN PATENT DOCUMENTS

| CN | 1223085 A     | 7/1999  |
| CN | 1308887 A     | 2/2001  |
| EP | 0576 726 B1   | 4/1997  |
| JP | 59-205960     | 11/1984 |
| KR | 2001-0029043  | 4/2001  |

* cited by examiner

Primary Examiner—Arthur L. Corbin
(74) Attorney, Agent, or Firm—Annette M. Frawley; Douglas J. Taylor; Arlene L. Hornilla

(57) ABSTRACT

The present invention relates to an improved binder system to stabilize and improve yield for thermally processed meat products such as those that are used in canning or retort operations. More specifically, the present invention pertains to the novel starch/binder matrix that produces a meat product having enhanced moisture flavor and texture over those treated using currently available techniques. The novel matrix uses a combination of starches that provide differential water holding and moisture control for the meat products treated therewith.

14 Claims, No Drawings

THERMALLY PROCESSED MEAT PRODUCTS

CROSS-REFERENCES TO RELATED APPLICATIONS

This application is a divisional of U.S. patent application Ser. No. 10/229,983 filed on Aug. 28, 2002, now U.S. Pat. No. 6,869,631.

BACKGROUND OF THE INVENTION

The present invention relates to an improved binder system to stabilize and improve yield for thermally processed meat products such as those that are used in canning or retort operations. More specifically, the present invention pertains to the novel starch/binder matrix that produces a meat product having enhanced moisture flavor and texture over those treated using currently available techniques. The novel matrix uses a combination of starches that provide differential water holding and moisture control for the meat products treated therewith.

There are a number of thermally treated and other processed meat products that are incorporated into soups, canned meals, frozen dinners and entrees, refrigerated and frozen snacks (pizzas, burritos, tacos to name a few) and the like. The difficulty with such processed meat products is that the meat can often lose many of its desired attributes such as color, texture, taste and even suffer from a substantial reduction in size or loss in yield during the processing. Consumers that meet with such disappointing meat products may choose another product or may not repurchase the product after the initial purchase has been made.

The meat portion of the products described above, are typically the most costly portion of the commercial offering that is, meat is more expensive than other components which may be included with consumer product such as vegetables, pasta, sauces and the like. Due to what is considered as normal processing of the meat products, as size or weight is lost, the producer if faced with the undesirable circumstance of having to either increase the amount of the meat starting material to make up for the loss in volume, or subject the meat to enhancement steps which may discolor the meat or decrease the flavor and/or texture of the meat product. As such, even a small improvement in the yield of meat which can be produced through thermal processing will generate a substantial savings to the producer as well as create improved benefits for the consumer.

A number of prior art solutions have been proposed to redress this situation. One such approach consists of coating the meat with a "skin" in order to prevent the moisture and flavors from escaping. An example of this technique is described in U.S. Pat. No. 3,792,173, which provides for a process of coating the exterior of the meat with a powder, consisting of a mixture of sugary syrup and a partially gelatinized starch, having a gelatinization temperature of not lower than 150°. The powder is defined as being particularly useful with sausages, hamburger, frankfurters and meat loaves. However, such processes can leave a product with an additional sheen or shiny appearance which may not be particularly desirable as the product may appear to have been treated. Such coatings are also not typically acceptable under high heat and pressure applications.

Another example of a coating for a meat product with a powder is found in U.S. Pat. No. 5,384,140. This patent describes a dry powdery coating that consists of a starch, a protein and optional flavoring is applied to the meat. The coating forms a skin, which limits the penetration depth of microwave energy so as to prevent the meat product from becoming prematurely dry. However, this system relies on a "water gain" step to compensate for the water that is lost during the microwave cooking, thereby arbitrarily adding weight to the product as well as suffering from the drawbacks identified above. In addition, the use of an additional protein in the binder system arbitrarily increases the cost associated with producing the meat product.

U.S. Pat. No. 5,403,600 provides another coating system used in retaining moisture in meat products. The coating provided in this solution includes a mixture of egg albumen, milk protein, an ungelatinized starch and water. However, the starch in this application acts to provide increase elasticity to the albumen and milk protein thereby decreasing the need for the starch to serve as a vehicle to take up water. In addition, the solution proposed in U.S. Pat. No. 5,403,600 provides for a significantly high usage of starch, one that is above 25% by weight of the mixture, and more preferably 35 to 55% of the weight of the mixture, in which the meat is coated.

Another problem associated with thermally processed meat is shrinkage, in that the meat, which has a tendency to lose moisture during processing, will also shrink in size making it appear that the manufacturer is trying to reduce cost by reducing the amount of meat in the portion, when this in fact is not the case. Rather, the manufacturer may be adding more meat to the process to make up for meat product that is lost during the treatment step or steps.

What is needed, is a binder system that overcomes the foregoing difficulties to produce a meat product that retains its desirable flavor and textural properties throughout processing.

Publications, patents and patent applications are referred to throughout this disclosure. All references cited herein are hereby incorporated by reference.

BRIEF SUMMARY OF THE INVENTION

The present invention represents approximately a 7-9% improvement over thermally processed meats that use a traditional or conventional binder system and a 15-20% increase over thermally processed meats that use no binder system in the preparation of the meat products. That is, the improvement comprises stabilizing the ultimate yield of meat products subjected to thermal treatment steps such as with a canning or retorting operation. The starch in the present invention comprises generally less than 25% by weight of the mixture that is used to coat the meat product or meat source. By using the novel combination of starches having different gelatinization temperatures, the multiple cooking steps of a thermal processing operation do not denigrate the meat products and instead allows the meat to be infused with additional moisture and even flavors to minimize yield loss.

In one embodiment of the present invention a method for producing thermally processed meat products for canning or retort operations that provides improved moisture content and texture after retorting is described and includes the steps of initially providing a meat source and creating a first mixture in a chamber. The mixture includes at least water, a phosphate, a salt and at least a first starch and a second starch. The first and second starches make up a total of less than 25% by weight of the mixture. The first starch has a gelatinization temperature below 175° and the second starch has a gelatinization temperature of about 200° F. or greater.

The meat source is added to the first mixture in said chamber and a vacuum is pulled. Next, the meat source infused with the first mixture to create a marinated meat. The marinated meat is discharged from the container and then cooked. After cooking, the meat is placed in a container in a vessel along with a second mixture and is cooked in the container. Alternatively, or in addition, the meat after discharging may be diced and then frozen prior to being placed in the container.

In a further embodiment of the present invention, a binder solution for use with thermally treating meat products to stabilize yield in a canning or retorting operation is described and includes a first starch having an amylose content of less than 50% and a second starch having an amylose content of about 50% or greater. The first and second starches making up less than 25% by weight of the binder solution. The binder solution also includes a phosphate selected from potassium phosphate, sodium phosphate and mixtures thereof. The binder solution has a salt that is selected from sodium chloride, potassium chloride and mixtures thereof and water that makes up greater than 75% of the solution. The solution is infused into a meat source to stabilize processing yield of the meat source through thermal processing.

The foregoing and other objects of the invention will become clear from an inspection of the detailed description of the invention and from the claims appended hereto.

DETAILED DESCRIPTION OF THE INVENTION

Surprisingly, it has been found that through the use of a novel combination of starches in a binder system as described in this invention, thermally processed meat products, such as those found in canned or retorted operations, such as with soups, stews, dinner entrees and the like, can have increased tenderness and improved size without loss of desirable attributes such as color or appearance. At least one of the starches used in the present binder system requires higher processing temperatures in order to gelatinize, generally temperatures about 200° F. or greater and preferably greater than 200° F. As such, the starches selected for use in the binder system of the present invention function to improve water-holding capacity of the meat during the multiple processing or cooking steps associated with canning or retorting. This enables the meat to hold on to meat juices and moisture thereby reducing shrinkage and loss of flavor and texture. That is, the starch based binder provides gelling properties such that during and after thermal processing, the starches provide enhanced water binding ability thereby improving the textural properties over a conventional binder system. While the results of the present binder system set forth in the following examples, may not seem significant, a slight yield increase, one even as little as 1% can generate savings of $150,000 or more in an annualized production of consumer products.

The present invention is now illustrated in greater detail by way of the following examples, but it should be understood that the present invention is not to be construed as being limited thereto.

In carrying out the present invention, a comparison test was conducted between meat subjected to a conventional process and meat prepared in accordance with the invention. The control (and listed as control in the tables below) consisted of the following:

| Ingredient | Percentage | Weight |
|---|---|---|
| Chicken | 80% | 3995.2/gm |
| Water | 17.30% | 863.96/gm |
| Salt | 1% | 49.94/gm |
| M160 | 1.3% | 64.92/gm |
| Phosphate | 0.4% | 19.98/gm |
| Total | 100% | |

The meat prepared in accordance with the present example (and listed as Test A and Test B in tables 2 and 3 below) consisted of the following:

| Ingredient | Percentage | Weight |
|---|---|---|
| Chicken | 80% | 3995.2/gm |
| Water | 16.2% | 809.02/gm |
| Salt | 1.5% | 74.91/gm |
| ISP | 0.75% | 37.46/gm |
| Dent Corn Starch | 0.4% | 19.98/gm |
| High Amylose Corn Starch | 0.75% | 37.46/gm |
| Phosphate | 0.4% | 19.98/gm |
| Total | 100% | |

Each of the ingredients for the control and the exemplary formulation were initially measured out. The phosphate was then mixed with the water until it was dissolved, then the remaining ingredients were added to the water and the solution mixed. In the above example, the mixture will be referred to as the marinade.

A dent corn starch, such as Melojel is a amylose containing food grade starch, derived from corn (approximately 25% amylose) and is available from National Starch of Bridgewater, N.J. A high amylose corn starch, such as Hylon V, is a food grade starch (approximately 50% or more amylose) and is derived from corn and is available from National Starch of Bridgewater, N.J. The combination of starches makes up less than 25% by weight of the first mixture or marinade that is introduced into chamber and preferably less than 10% by weight and more preferably less than 5% by weight of the mixture. The high amylose starch is selected for properties, including gelatinization temperatures of greater than 200° F. and more preferably greater than 250° F. and even 300° F. The first starch is selected for its gelatinization temperatures below 175° F., preferably below 165° F. and possibly as low as 140° F. By providing a combination of starches the lower starches gelatinize during a first cooking or thermal treatment step and the second starch (high amylose) gelatinizes during a second thermal treatment step.

The phosphate as used herein is preferably sodium tripolyphosphate available from a number of known commercial sources. Another phosphates that may also be useable is potassium tripolyphosphate which may be used alone or in combination with sodium tripolyphosphate. The salts used herein may be sodium chloride, potassium chloride or mixtures thereof.

ISP is isolated soy protein available from Protein Technologies, International, a division of E. I. Du Pont de Nemours Company, Wilmington, Del. M160 is a blend of modified food starch, soy protein isolate, carrageen (seaweed) also available from Protein Technologies, International, a division of E. I. Du Pont de Nemours Company, Wilmington, Del. While isolated soy protein has been used in the foregoing example, other protein sources are of course available and useable in connection with the present invention. These include but are not limited to soy protein, whey protein, wheat protein, rice protein, corn protein, oat protein and the like or mixtures thereof.

The chicken is then placed in a tumbler and the marinade added. A vacuum is pulled to a minimum of 22 to about 30 inches with about 25 to 30 inches being preferred. The chicken/marinade combination is then tumbled for approximately 30 minutes. The chicken in the control is also placed in a tumbler with its solution; a vacuum is pulled and then tumbled for 30 minutes. A second batch prepared in connection with the present invention was tumbled for 45 minutes. After the tumbling periods were complete, the contents of the vessel were emptied and placed in a cooler. The tumbling or marinating time period can range from about 15 minutes to around an hour. Tumbling the marinade and meat under a vacuum, causes the meat/starch complex to act as a sponge thereby permitting the meat to become infused with the marinade.

After tumbling, a portion of the meat that has been infused with the marinade or other solution was weighed and the results that were obtained are set forth in the following table.

TABLE 1

| Tumbling Results | % Yield = Weight After Tumbling/before tumbling |
|---|---|
| Control (30 minutes) | 117% = 4686.3 grams/3994.3 grams |
| Test A (30 minutes) | 119% = 4779.7 grams/4005.3 grams |
| Test B (30 minutes) | 119% = 4788.5 grams/3996.1 grams |

The remaining portions of the sample that were prepared in connection with the control and in accordance with the present invention were pulled from the tumbler and then placed in a convection oven with humidity control. (Humidity control may include a pan of water placed in the oven to provide additional humidity during the cooking process.) The cooking process may use a rotating, mesh belt that permits the heating to occur on both sides of the meat as it is traveling through the oven.

During the cooking the internal temperature of the chicken is monitored so as to not exceed 175° F. The meat is removed or discharged from the oven and allowed to cool to room temperature. The chicken is then diced into roughly ¾" squares and then frozen. During this first cooking step, the first starch gelatinizes and the second starch remains in the binder matrix.

Cooking of the meat source after the step of infusing the meat may be an optional step, as the applicants have found that the present invention can achieve similar results without this intermediate cooking step. If no intermediate cooking occurs, the meat, may be diced or cut into appropriate sizes and then placed frozen into the second mixture within the containers in the vessel. The first starch will gelatinize at a temperature below 175° F. and the second starch when the temperature exceeds 200° F.

Next, the meat dices are placed into containers with a broth and then are placed within a retort and cooked again for a period of time ranging from 10 minutes to an hour. The containers are filled with a second mixture and in this example, chicken broth is selected and meat and second mixture subjected to retorting. During this thermal treatment step, the temperatures typically exceed 200° F. and are sufficient to gelatinize the second starch.

The second mixture that is used in the present invention may be broth, soup or meat stock, sauces or other flavor imparting fluids that can provide desirable flavors or textures to the meat being treated or be part of the consumer product.

In comparing the results with that of the test material prepared in accordance with the present invention during cooking with a control, the results presented in the following table were obtained.

TABLE 2

| | % Processing Yield = final weight/total weight |
|---|---|
| Control | 87.9% = 1110.3 grams/1262 grams |
| Test A | 96.7% = 1215 grams/1255.5 grams |
| Test B | 95.4% = 1170.6 grams/1227.6 grams |

As can be seen from the results presented in table 2, a 7-9% increase over the control was obtained by using the binder system of the described herein thereby improving the yield of the meat subjected to the marinade.

The "green yield" of the control and test materials is provided in the following table. In order to obtain the "chicken weight" in table 3, the "total weight" in the processing yield calculation is multiplied by the amount of chicken/meat in the original make up or ingredient listing. For example, in the control, the total weight in the processing yield calculation was 1262 grams multiplied by 80% (the proportion of the chicken/meat in the ingredients) yields the chicken weight or 1262 grams×0.80=1009.6 grams. The term "green yield" refers to the yield of the entire product or batch being produced by the process. In order to calculate green yield, the weight of the meat and ingredients used in the process added together. After cooking, the weight and ingredients are weighed and the amount or weight is the resulting green yield. The present invention stabilizes the yield of the meat and minimizes loss of the meat during processing.

TABLE 3

| | % Green Yield = final weight/chicken weight |
|---|---|
| Control | 109% = 1110.3 grams/1009.6 grams |
| Test A | 120% = 1215 grams/1004.4 grams |
| Test B | 119% = 1170.6 grams/982.1 grams |

Table 3 also provides the results of improved or increased green yield that occurred through the treatment of a meat product using a high amylose starch binder system of the present invention.

The foregoing tables provide that by treating the meat with the starch binder matrix as provided in the present invention, significant yield improvements can be obtained resulting in a thermally processed meat product having enhanced flavor and texture without a loss in size of the meat product during subsequent thermal processing, such as canning or retorting. Treatment of meat products in accordance with the present invention consistently showed an improvement (ranging from 5 to 9% over conventional binder systems) in the amount or weight of chicken that was left over after processing.

In addition to chicken, the present invention was practiced using clams as the starting material. Mollusks, especially ocean clams (also known as quahog clams) are commonly used in processing clam chowder and other soups. The reason for this is that quahog clams are generally large clams (as opposed to littleneck, middleneck or cherry stone clams or surf clams). One of the principal complaints that consumers have with respect to using these clams in these products is that the clams are chewy and tough. The present invention overcomes some of these drawbacks as well as those related to loss of yield suffered in prior art binder systems through the combination of the marinating or infusing of the clams with the solution set forth below (the solution solubilizes the proteins by altering the pH by the action of the salt and phosphate salts on the proteins) and the softening of the clams due to the mechanical action created by the tumbling The marinated clams produced in accordance herewith are set forth in the following tables. The control group for this example consisted of 100% with no added ingredients or materials.

TABLE 4

Test 1

| Ingredient | Percentage | Weight/grams |
|---|---|---|
| Clams | 80% | 3632 |
| Water | 19.1% | 867.14 |
| Salt | .50% | 22.7 |
| Phosphate | .40% | 18.16 |
| Total | 100% | |

TABLE 5

Test 2

| Ingredient | Percentage | Weight/grams |
|---|---|---|
| Clams | 80% | 3632 |
| Water | 17.6% | 799.04 |
| Salt | .50% | 22.7 |
| ISP | 1.5% | 68.1 |
| Phosphate | .40% | 18.16 |
| Total | 100% | |

TABLE 6

Test 3

| Ingredient | Percentage | Weight/grams |
|---|---|---|
| Clams | 80% | 3632 |
| Water | 18.15% | 834.44 |
| Salt | .50% | 11.35 |
| Starch | .20 | 9.8 |
| High Amylose Corn Starch | .75% | 34.05 |
| Phosphate | .40% | 18.16 |
| Total | 100% | |

The ingredients from each of the tests as well as the control group are initially measured out and then for test groups 1 through 3, phosphate is mixed in with the water until it is dissolved. Next, all of the ingredients, except for the clams, for each of the test groups are then added to the mixture of phosphate and water. The clams are then added to the mixture, hereinafter, marinade, and then the clams and marinade are poured into the tumbler.

A vacuum is pulled in the tumbler to a minimum of 22 inches and the clams and marinade are tumbled for twenty minutes. The clams and marinade are removed and the liquid is drained off from the clams to obtain the amount of weight increase of the clams. The results are set forth in the following table. 100% representing the weight of the clams in the control group.

TABLE 7

| Group | Weight Increase = finish weight/starting weight |
|---|---|
| Test 1 | 2% (102%) = 82 grams/80 grams |
| Test 2 | 12% (112%) = 90 grams/80 grams |
| Test 3 | 6% (106%) = 85 grams/80/grams |

After the marinated clams were removed from the tumbler they were cooked in batches by placing approximately 200 grams of the material into a vessel containing broth or soup stock such as used in the creation of clam chowder or other soups having clams therein. The control group and clams from each of the tests were cooked for approximately 20 minutes. The water was then drained from the clams and the clams placed in airtight containers and cooked again in the retort in a second mixture, here a broth or soup stock such as used in the creation of clam chowder or other soups having clams therein. The clams were removed from the containers, drained and weighed. The results of the tests are set forth in the following table.

TABLE 8

| Group | Loss of Weight/Yield |
|---|---|
| Control | 50.5 grams/80 grams = 63% |
| Test 1 | 56 grams/82 grams = 68% |
| Test 2 | 66 grams/90 grams = 73% |
| Test 3 | 60 grams/85 grams = 70% |

The results of the foregoing table provide that the yield of the meat, in this instance clams, is improved over the control from 5 to 10% when considering a straight correlation of the data.

While the examples set forth in the instant application include chicken and clams, the invention as described herein is also suitable for use with beef, lamb, pork, bison, alligator, fish, shell fish, mollusks and mixtures thereof.

Other starches may be suitable for use with the present invention, such starches include but are not limited to potato, tapioca, rice, wheat and combinations thereof. In addition, the present invention may use chemically modified or unmodified (natural) starches, with unmodified starches being preferred.

It will thus be seen according to the present invention a highly advantageous method of improving yield in thermally processed meat has been provided. While the invention has been described in connection with what is presently considered to be the most practical and preferred embodiment, it will be apparent to those of ordinary skill in the art that the invention is not to be limited to the disclosed embodiment, that many modifications and equivalent arrangements may be made thereof within the scope of the invention, which scope is to be accorded the broadest interpretation of the appended claims so as to encompass all equivalent structures and products.

The invention claimed is:

1. A method for producing thermally processed meat products for thermal processing operations having improved moisture content and texture, comprising the steps of:
   providing a meat source;
   creating a first mixture in a chamber including water, a phosphate, a salt and at least a first starch and a second starch, said first and second starches making up a total of less than 25% by weight of said mixture and said first starch having a gelatinization temperature below 175° F. and said second starch having a gelatinization temperature of about 200° F. or greater;

adding said meat source to said first mixture in said chamber;

pulling a vacuum in said chamber;

infusing said meat source with said first mixture, in said chamber, to create a marinated meat;

discharging said marinated meat;

placing the discharged meat in a second mixture distinct from said first mixture in a container placed within a vessel; and then cooking said marinated meat in said chamber.

2. A method for producing thermally processed meat products as recited in claim 1, wherein said second starch is a high amylose corn starch.

3. A method for producing thermally processed meat products as recited in claim 1, wherein said first starch is dent corn starch.

4. A method for producing thermally processed meat products as recited in claim 1, wherein the phosphate includes sodium tripolyphosphate, sodium phosphates or combinations thereof.

5. A method for producing thermally processed meat products as recited in claim 1, wherein the mixture includes a protein source.

6. A method for producing thermally processed meat products as recited in claim 5, wherein the protein source is selected from the group consisting of soy protein, isolated soy protein, whey protein, wheat protein, rice protein, corn protein, oat protein or mixtures thereof.

7. A method for producing thermally processed meat products as recited in claim 1, wherein the meat source is selected from the group consisting of chicken, beef, pork, lamb, bison, alligator, fish, shell fish, mollusKs and mixtures thereof.

8. A method for producing thermally processed meat products as recited in claim 1, wherein the meat source is mollusks.

9. A method for producing thermally processed meat products as recited in claim 1, wherein the vacuum is pulled to a minimum of 22 inches.

10. A method for producing thermally processed meat products as recited in claim 1, wherein the second mixture is selected from broth, soup, sauces, flavoring fluids and combinations thereof.

11. A method for producing thermally processed meat products as recited in claim 1, wherein the thermal processing operations are canning and retorting.

12. A method for producing thermally processed meat products as recited in claim 1, wherein the marinated meat is tumbled.

13. A method for producing thermally processed meat products as recited in claim 1, comprising the further step of immediately after infusing the meat source, cooking the marinated meat.

14. A method for producing thermally processed meat products as recited in claim 1, including a further step of after discharging the marinated meat, cutting the marinated meat and then freezing the cut marinated meat.

* * * * *